United States Patent [19]

Grzywna

[11] Patent Number: 5,231,918
[45] Date of Patent: Aug. 3, 1993

[54] APPLICANCE FOR BREWING COFFEE OR TEA

[75] Inventor: Stanley E. Grzywna, Elyria, Ohio
[73] Assignee: Mr. Coffee, Inc., Bedford Heights, Ohio
[21] Appl. No.: 718,793
[22] Filed: Jun. 21, 1991
[51] Int. Cl.⁵ ............................................. A47J 31/00
[52] U.S. Cl. ....................................... 99/295; 99/299; 99/307
[58] Field of Search ................ 99/279, 285, 290, 295, 99/299, 300, 302 R, 304, 305, 306, 307, 316; 426/433

[56] References Cited

U.S. PATENT DOCUMENTS

| | | | |
|---|---|---|---|
| 4,674,400 | 6/1987 | Rondel | 99/279 |
| 4,882,983 | 11/1989 | Pastrick | 99/299 |
| 4,893,552 | 1/1990 | Wunder | 99/299 |

FOREIGN PATENT DOCUMENTS 62-11848  3/1987  Japan .
2111377  7/1983  United Kingdom .
2135570  2/1984  United Kingdom .

*Primary Examiner*—Robert W. Jenkins
*Attorney, Agent, or Firm*—D. Peter Hochberg; Mark Kusner

[57] ABSTRACT

An appliance for brewing a flavor-carrying material such as coffee, tea or the like. The appliance includes a reservoir for receiving a predetermined amount of water, heating means for heating the water and a brew basket having a chamber adapted to receive a predetermined amount of flavor-carrying particulate therein. The brew basket includes an open upper end, an aperture at the lowest portion of the chamber, and a valve element movable between a first position and a second position to create a drain opening at two locations within the chamber. In the first position, the valve element defines a drain opening a predetermined height above the lowest portion of the chamber and in the second position defines a drain opening at the lowest portion of the chamber.

42 Claims, 11 Drawing Sheets

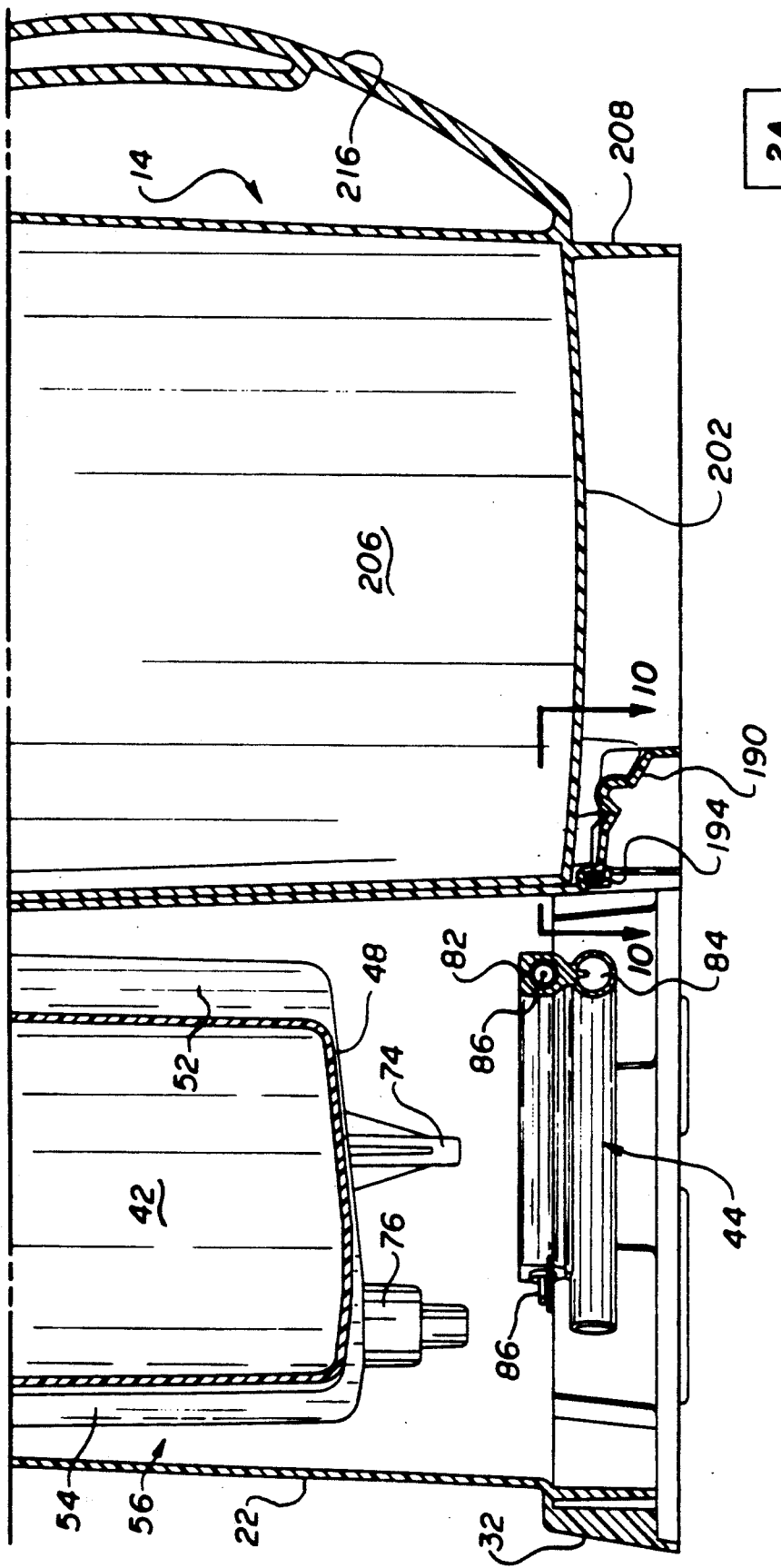

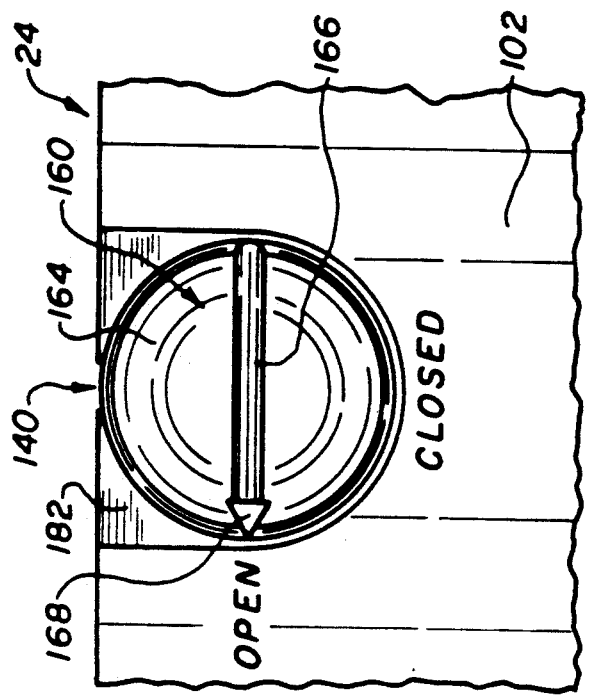
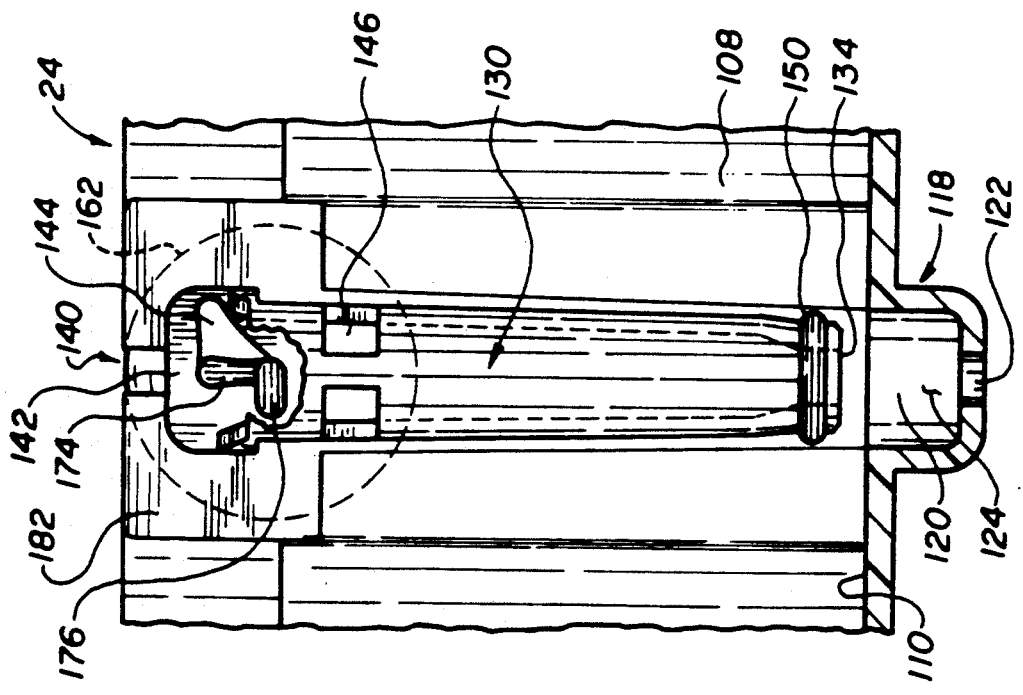

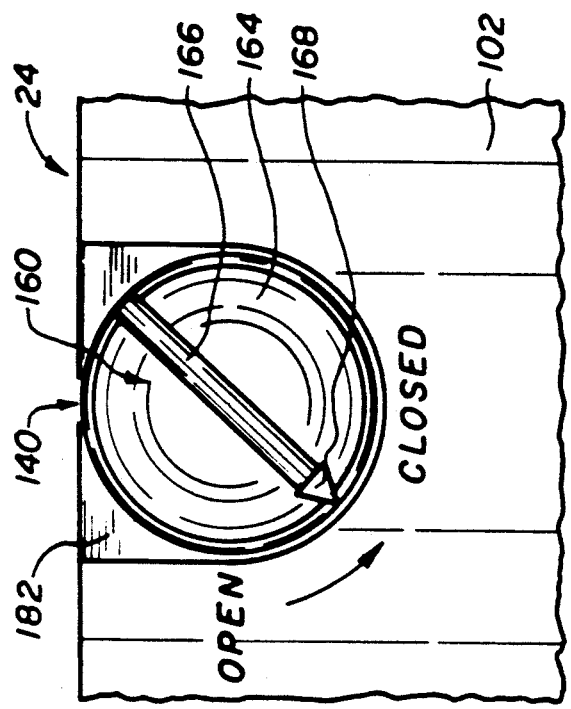
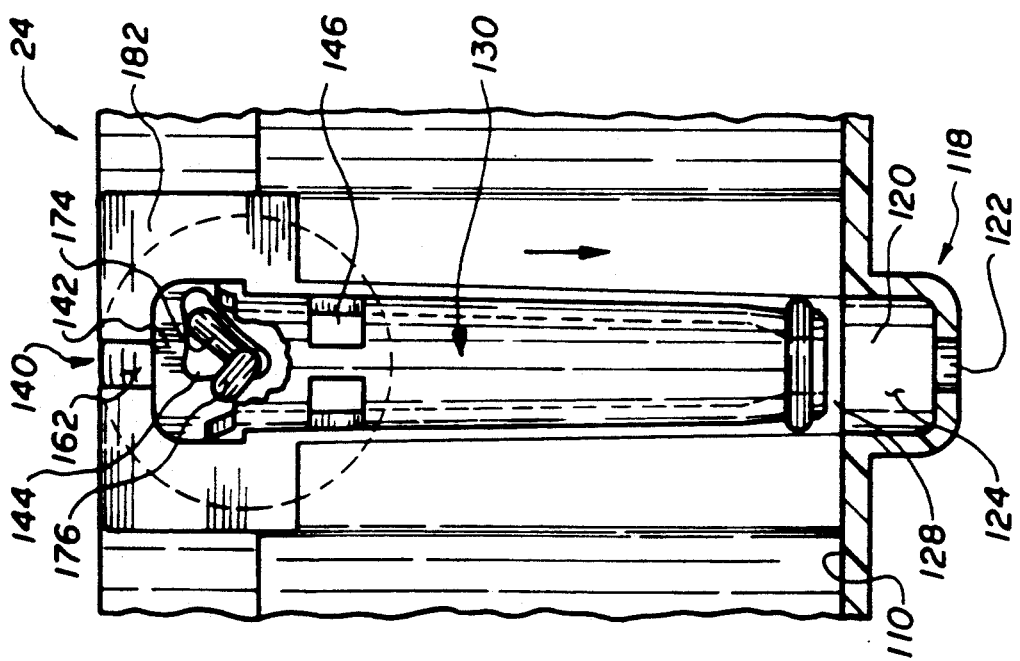

> # APPLIANCE FOR BREWING COFFEE OR TEA

FIELD OF THE INVENTION

The present invention pertains to an appliance for brewing coffee, tea or the like and more particularly to a conventionally known, automatic drip-type appliance for making coffee or tea. The invention is particularly applicable to a device for making freshly brewed iced tea and will be described with particular reference thereto, although it will be appreciated that it may also be used in making hot coffee, hot tea, iced coffee or similar beverages.

BACKGROUND OF THE INVENTION

The present invention pertains generally to conventionally-known, automatic drip-type appliances, and more particularly to an appliance of the type shown in U.S. Pat. No. 4,882,983 to Pastrick entitled APPLIANCE FOR BREWING COFFEE/TEA. The present invention specifically relates to improvements and modifications to the invention described and claimed in the aforementioned patent, the disclosure of which is specifically incorporated by reference herein.

SUMMARY OF THE INVENTION

In accordance with the present invention, there is provided an appliance for brewing a flavor carrying material, such as coffee, tea or the like. The appliance includes a reservoir for receiving a predetermined amount of water, and means for heating the water. A brew basket having a chamber adapted to receive a predetermined amount of flavor carrying material is provided to receive heated water from the reservoir after it has been heated by the heating means. Port means are provided within the container for draining the chamber. The port means include a movable valve member operable to create a drain opening at two locations within the brew basket. The valve member has a first position defining a drain opening a predetermined height above the bottom of the chamber and a second position wherein a drain opening is defined at the bottom portion of the chamber.

In accordance with another aspect of the present invention, there is provided an appliance for brewing a flavor-carrying material such as coffee, tea or the like. The appliance includes a reservoir for receiving a predetermined amount of water, heating means for heating the water and a brew basket having a chamber adapted to receive a predetermined amount of flavor-carrying particulate therein. The brew basket has an open upper end and an aperture at the lowest portion of the chamber. Means are provided for delivering heated water from the heating means to the chamber. Valve means movable between a first position and a second position is provided to create a drain opening at two locations in the chamber. The valve means has a first position which defines a drain opening a predetermined height above the lowest portion of the chamber and a second position wherein it defines a drain opening at the lowest portion of the chamber.

In accordance with another aspect of the present invention, there is provided an appliance for making iced tea/coffee. The appliance includes a cylindrical, columnar housing containing a reservoir for holding a predetermined amount of water, heating means for heating water from the reservoir and a brew basket having a chamber adapted to receive coffee, tea or the like. The chamber has an aperture at the lowest portion thereof for draining brewed, heated tea or coffee from the chamber and a tubular valve member within the chamber movable along a generally vertical axis between a first position and a second position. In the first position the valve member obstructs the aperture and establishes a drain outlet a predetermined height above the lower portion of the chamber and in the second position allows flow through the aperture.

In accordance with another aspect of the present invention, there is provided an appliance for automatically making freshly-brewed iced tea or iced coffee. The appliance includes a reservoir for holding a predetermined amount of water, a heating system disposed below the reservoir for heating said water, and a brew basket disposed above the reservoir having a chamber adapted to receive coffee particulate or tea particulate therein. A valve member is associated with the brew basket for creating a drain outlet in the brew basket for draining brewed coffee or brewed tea therefrom. The valve member is movable between a first position wherein the valve member establishes a drain outlet a predetermined height above the lowest point in the chamber and a second position wherein the valve member establishes a drain outlet at the lowest point in the chamber. A housing contains the reservoir, the heating unit, the brew basket and the valve member and an actuator on the housing is connected to the valve member for moving the valve member between the first position and the second position.

In accordance with another aspect of the present invention, there is provided a brew basket for holding tea, coffee or the like and for receiving heated water at a predetermined location on the appliance for automatically brewing coffee, tea or the like. The brew basket has a generally cylindrical shape, a closed lower end and an open upper end defining a chamber for receiving the coffee, tea and water. An aperture is located at the lowest portion of the chamber for draining the basket and includes surface means thereabout. An elongated, tubular valve member is provided having an upper end, a lower end and an internal bore communicating an opening in the upper end with an opening in the lower end. The lower end is dimensioned to matingly engage with the surface means of the aperture and to form a generally fluid-tight seal therewith wherein the opening in the lower end is in communication with the aperture. The valve member is movable between a first position wherein the lower end of the valve member is displaced from the aperture and a second position wherein the lower end of the valve member matingly engages the aperture such that fluid within the chamber is drained from the basket through the internal bore of the valve member and the aperture when the fluid reaches the opening in the upper end of the valve member.

In accordance with another aspect of the present invention, there is provided an appliance for automatically making freshly-brewed tea or coffee. The appliance includes a reservoir for holding a predetermined amount of water, a heating system for heating said water, and a brew basket having a chamber adapted to receive coffee particulate or tea particulate therein and a drain port at the bottom of the chamber for draining liquid from the chamber. A valve member is associated with the chamber and is manually movable to a position wherein the valve member is operable to establish a predetermined height of liquid in the chamber and to direct the flow of liquid exceeding the predetermined height along a path through the drain port.

It is an object of the present invention to provide an appliance for automatically brewing fresh iced tea, iced coffee or the like.

Another object of the present invention is to provide an appliance as described above which is suitable for making hot tea or hot coffee.

A further object of the present invention is to provide an appliance as described above having a brew basket in which a predetermined head of heated water for brewing or steeping a flavor-carrying particulate material may be established and maintained.

A still further object of the present invention is to provide an appliance as described above having a brew basket including a movable valve element operable to selectively define an upper drain port or lower drain port.

A still further object of the present invention is to provide a brew basket as described above wherein liquid drained from the brew basket through either the upper drain port or the lower drain port flows from the brew basket at a single location.

A still further object of the present invention is to provide an appliance as described above wherein the movable valve element is controlled by actuating means disposed upon the housing of the appliance.

A still further object of the present invention is to provide an appliance having an aesthetically pleasing profile with the operative components of the appliance disposed within such profile.

A still further object of the present invention is to provide an appliance as described above having receptacle means for use therewith, including sensing means for indicating when the receptacle is aligned with the appliance.

These and other objects and advantages of the present invention will become apparent from the following description of a preferred embodiment, taken together with the accompanying drawings.

DESCRIPTION OF THE DRAWINGS

The invention may take physical form in certain parts and arrangement of parts, a preferred embodiment of which will be described in detail in the specification and illustrated in the accompanying drawings wherein:

FIG. 2B is a sectioned elevational view of the lower portion of the appliance shown in FIG. 1;

FIGS. 7 and 7A are respectively enlarged views of the valve element and an actuator showing the relative position of such components when the valve element is in an "OPEN position";

FIGS. 8 and 8A are respectively enlarged views of the valve element and the actuator showing the direction of movement of the respective components as the actuator is moved from the "OPEN" to a "CLOSED" position;

DETAILED DESCRIPTION OF PREFERRED EMBODIMENT

Figure 1:
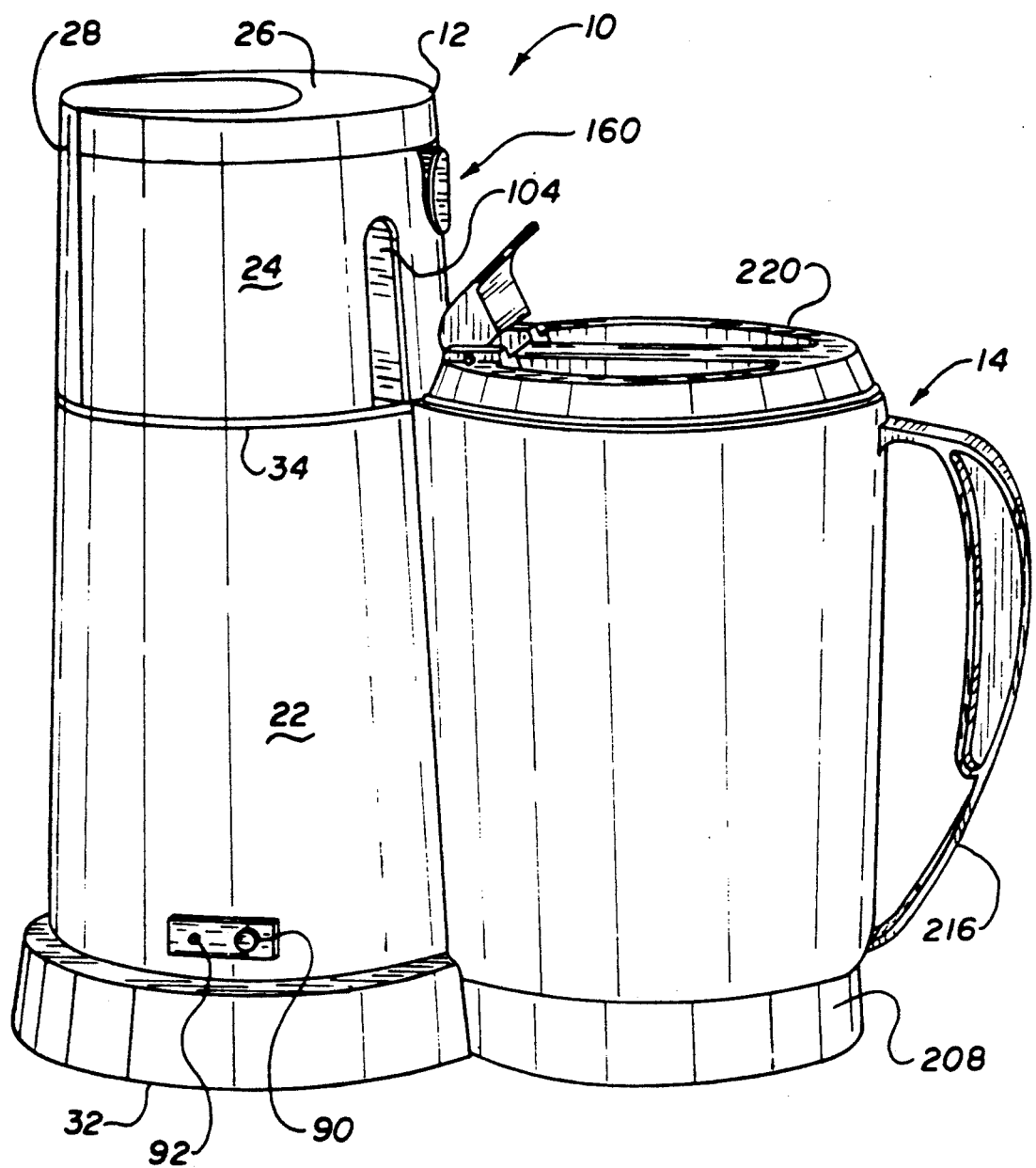
FIG. 1 is a prospective view of an appliance for making freshly brewed iced tea or iced coffee illustrating a preferred embodiment of the present invention.

Referring now to the drawings wherein the showing is for the purpose of illustrating a preferred embodiment of the invention only, and not for the purpose of limiting same, FIG. 1 shows an appliance for making iced tea or iced coffee. Broadly stated, appliance 10 is comprised of a brewing unit 12 for brewing a beverage such as coffee, tea or the like, and a receptacle 14 for receiving brewed beverage from brewing unit 12.

Figure 2A:
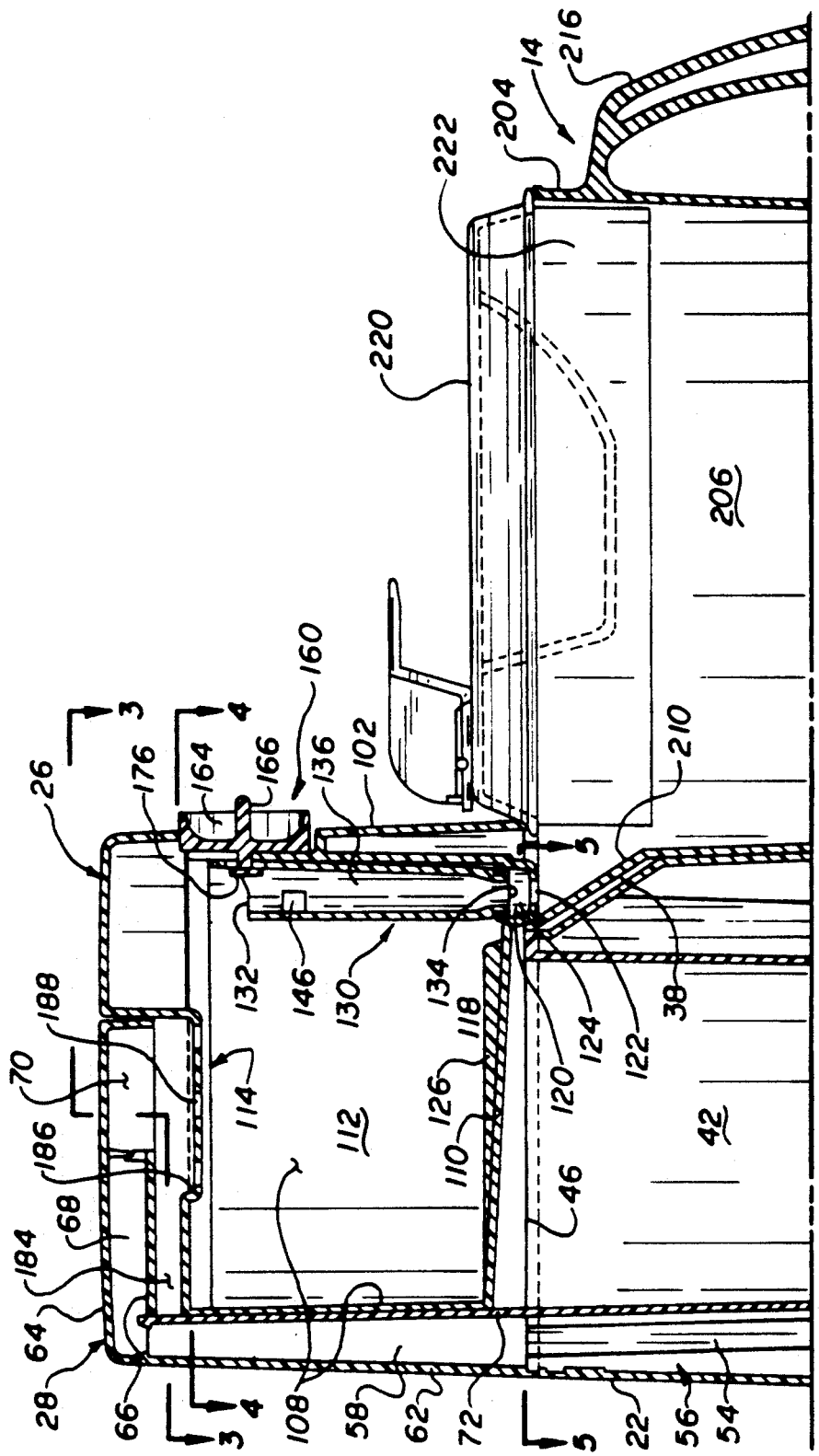
FIG. 2A is a sectional elevational view of the upper portion of the appliance shown in FIG. 1.
Figure 5:
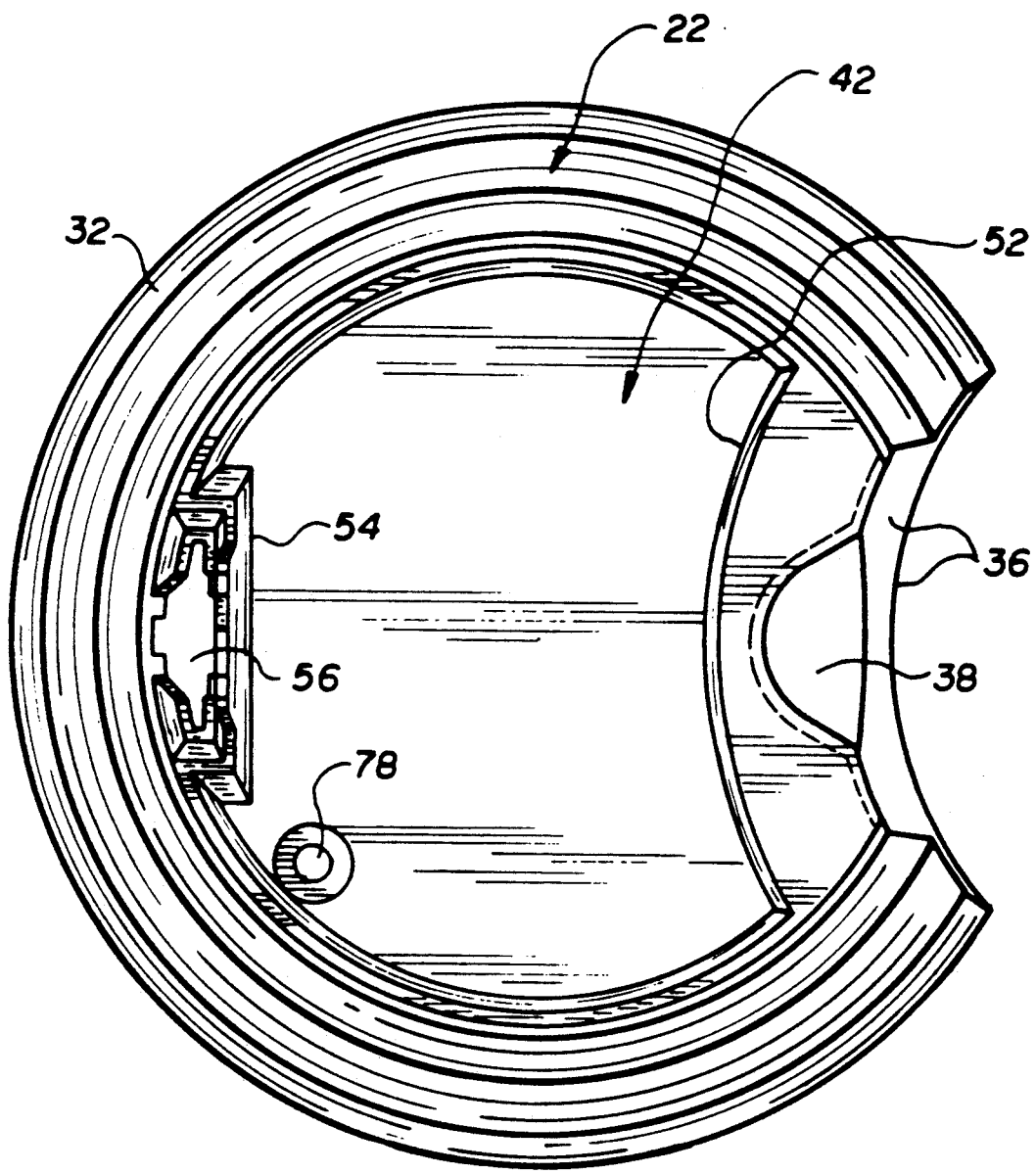
FIG. 5 is a plan view taken along line 5—5 of FIG. 2A showing an internal water reservoir of the appliance shown in FIG. 1.

In the embodiment shown, brewing unit 12 is basically comprised of a base member 22, a removable brew basket 24, a brew basket cover 26 and a generally L-shaped shroud 28 (best seen in FIGS. 2A and 2B) which projects upward from base member 22 and extends over cover member 26. Base member 22, brew basket 24, cover 26 and shroud 28 are preferably dimensioned to be assembled such that brewing unit 12 has a generally cylindrical, columnar shape with a generally continuous linear outer profile as shown in FIG. 1. In this respect, base member 22 is generally cylindrical in shape and has a flared lower end 32 and an open upper end 34. An arcuate recess 36 (best seen in FIG. 5) is formed along one side of base member 22 from lower end 32 to upper end 34. An indentation 38 is formed in base member 32 at the upper end 34 thereof, which indentation 38 communicates with arcuate recess 36, as best illustrated in FIGS. 2A and 5. In this respect, arcuate recess 36 is dimensioned to mate with receptacle 14, and to this end, indentation 38 is dimensioned to receive a spout on receptacle 14, as will be described in greater detail below. Base member 22 is dimensioned to encase or house a water reservoir 42 and a heating unit 44. Reservoir 42 is generally cup-shaped and includes an open upper end 46 and a closed lower end 48. Reservoir 42 is dimensioned to generally conform to the internal cavity defined by base member 22 and to be positioned therein as shown in FIGS. 2A and 2B. In this respect, water reservoir 42 has an arcuate recess 52 over a major portion of its side generally matching arcuate recess 36 formed in base member 22. A generally rectangular recess or groove 54 is also formed along the opposite side of reservoir 42. Rectangular groove 54 forms a generally rectangular channel or cavity 56 between reservoir 42 and base member 22, which channel 56 extends vertically along the inner surface of base member 22.

Channel 56 is disposed to communicate with a channel or cavity 58 formed in shroud 28, as best seen in FIG. 2A. In the embodiment shown, shroud 28 is basically formed from a vertical shroud member 62 and horizontal shroud members 64, 66. Horizontal shroud sections 64, 66 define a horizontal channel or cavity 68.

In this respect, as best seen in FIGS. 2A and 2B, channels 56, 58 and 68, together define a continuous cavity or passageway from the lower portion of base member 22 to the upper end of unit 12 which terminates in an opening 70 located generally along the centered axis of the columnar brewing unit 12. In the embodiment shown, reservoir 42 is formed to include an upward extending wall 72 (best seen in FIG. 2A) which together with vertical shroud member 62 defines shroud channel 58.

Referring now to closed lower end 48 of reservoir 42, mounting boss 74 for supporting reservoir 42 on base member 22 is provided, together with a downward extending tubular extension 76 which defines an outlet port 78 (best seen in FIG. 5). Outlet port 78 is dimensioned to receive a directional valve (not shown) permitting one-directional flow out of reservoir 42.

Referring now to heating unit 44, such unit in and of itself forms no part of the present invention and accordingly, shall not be described in great detail. In general, heating unit 44 is generally a U-shaped heating element of a type conventionally known and used in automatic drip-type coffee makers. Broadly stated, heating unit 44 is comprised of an aluminum extrusion having side-by-side passages 82, 84 extending therethrough. Passage 82 includes a ceramic heating core element 86 therein which is operable to increase in temperature when electrical current is passed therethrough. Heating core element 86 is preferably controlled by a resettable thermostat (not shown) which is activated by a button switch 90 (best seen in FIG. 1) which extends through the wall of base member 22 to be exposed on the outer surface of brewing unit 10. Heating unit 44 and switch 90 may be connected to the resettable thermostat by an arrangement of the type disclosed in U.S. Pat. No. 4,882,983, the disclosure of which is incorporated by reference herein. An indicator light 92 is preferably provided and electrical connected to heating unit 44 to provide an indication when heating unit 44 is electrically activated. In the embodiment shown, heating unit 44 has a 120 Volt, 725 Watt rating. According to the present invention, heating unit 44 is oriented to lie in a generally horizontal plane below reservoir 42, so as to facilitate a large reservoir 42 being located within base member 22 and further to permit reservoir 42 to be positioned lower within base member 22. One end of passage 84 of heating unit 44 communicates with tubular extension 76 of reservoir 42 by tubing (not shown) to receive water therefrom. The other end of passage 84 is connected to a conduit (not shown) which extends through the passage formed by channels 56, 58 and 68 to opening 70 in shroud 28 to transfer heated water from heating unit 44 to brew basket 24. In this respect, heating unit 44 heats water from reservoir 42 and conveys such heated water by steam pressure to an opening 70 above brew basket 24, as is conventionally known.

Referring now to FIGS. 2A, 4 and FIGS. 6–9A, brew basket 24 is shown. In the embodiment disclosed, brew basket 24 is adapted to be positioned above reservoir 42 and to be supported by base member 22. Importantly, the outer surface of brew basket 24 is preferably dimensioned to maintain the continuous linear outer profile established by base member 22. In this respect, in the embodiment shown, brew basket 24 includes a generally cylindrical outer wall 102 dimensioned to conform to the outer profile of base member 22. Outer wall 102 includes a pair of spaced-apart vertically oriented grooves or recesses 104 (best seen in FIG. 1) dimensioned to provide finger access to facilitate gripping and holding of brew basket 24. A generally rectangular recess 106 (best seen in FIG. 4) is formed in one side of brew basket 24 to receive the vertical portion of shroud 28 therein. Brew basket 24 includes an inner wall 108 and a bottom wall 110 which together form an inner cavity or wetting chamber 112 having an opened upper end 114. Chamber 112 is provided for holding tea, coffee or the like and for receiving heated water from heating unit 44. Brew basket 24 includes a drain port 118 formed at the lowermost portion of chamber 112. In the embodiment shown, drain port 118 is generally comprised of a cylindrical recess or counterbored hole 120 having an aperture 22 through the bottom thereof, which recess or hole 120 defines a cylindrical inner surface 124 about aperture 22.

Figure 4:
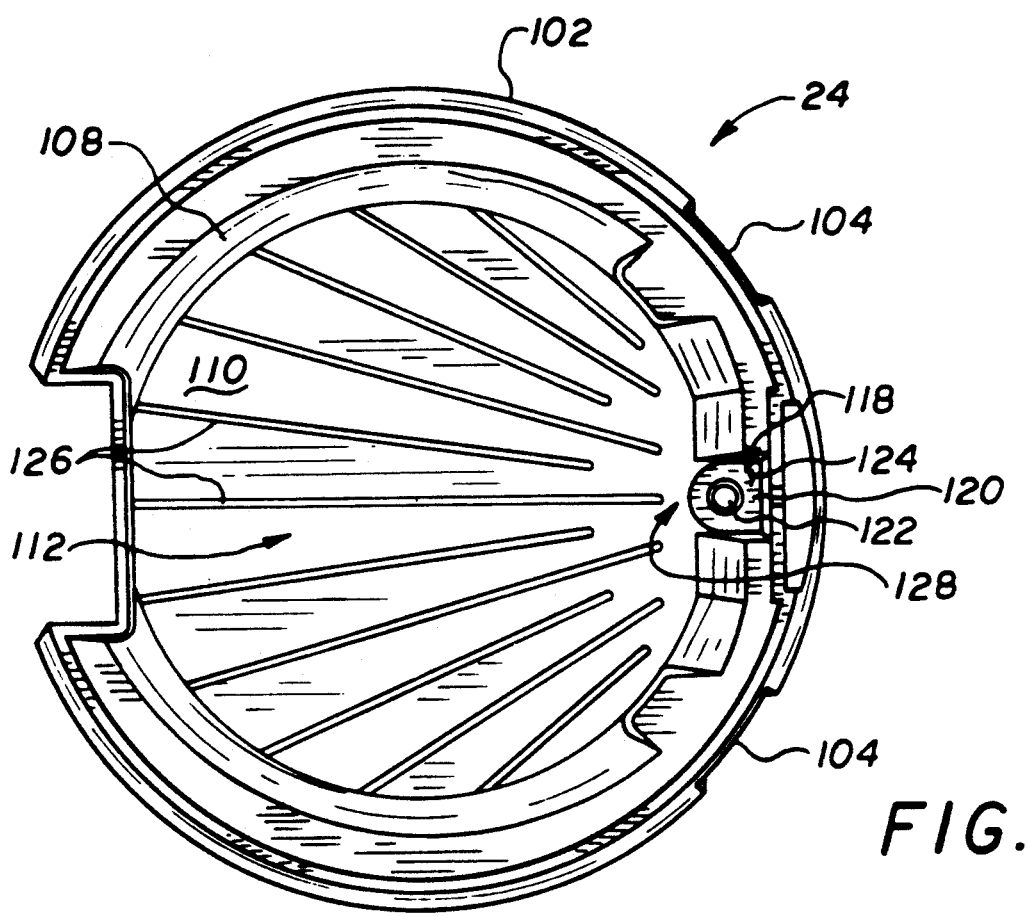
FIG. 4 is a plan view taken along line 4—4 of FIG. 2A showing a removable brew basket of the appliance shown in FIG. 1.

To facilitate drainage through drain port 118, bottom wall 110 of brew basket 24 is inclined slightly toward drain port 118 as best illustrated in FIG. 2A. A plurality of ribs 126 (best seen in FIG. 4) are provided on the upper surface of bottom wall 110. In this respect, chamber 112 of brew basket 24 is dimensioned to receive a conventionally known paper filter (not shown) when loose coffee or tea is used therein and ribs 126 elevate the filter above the surface of bottom wall 110 to facilitate drainage. As best seen in FIG. 4, inner wall 108 of brew basket 24 is dimensioned to include a generally rectangular slot 128 above drain port 118. Slot 128 is aligned with drain port 118 and extends vertically therefrom.

Figure 6A:
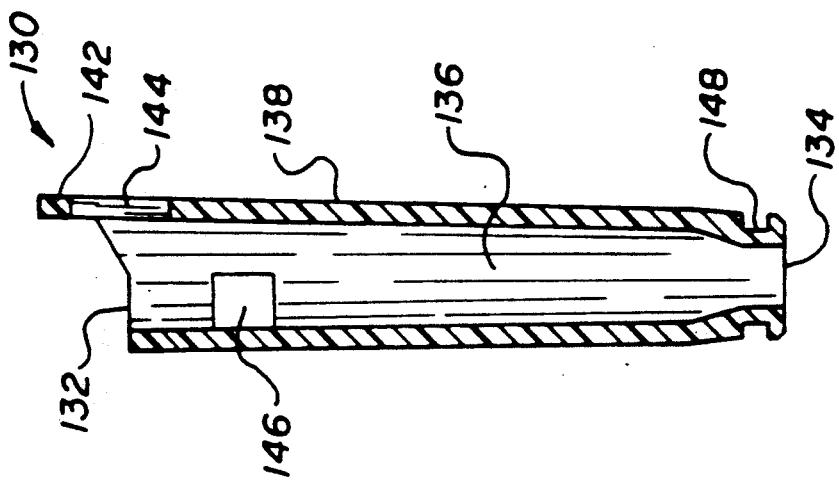
FIG. 6A is an enlarged sectional view of a valve element used in the brew basket shown in FIG. 6.

According to one aspect of the present invention, a valve member 130 is provided within brew basket 24 to selectively control the flow of fluid therefrom through aperture 122. Valve member 130 (best seen in FIGS. 6 and 6A) is generally tubular in shape and has an open upper end 132 and an open lower end 134 and a central bore 136 communicating opened upper end 132 with opened bottom end 134. In the embodiment shown, the lower end of valve member 130 is generally cylindrical in shape, but includes a planar back wall surface 138 along the upper portion thereof. A generally flat wall portion 142 is formed at the upper end of valve member 130 and includes a generally triangular aperture 144 therein. A pair of ports 146 are also provided at the upper end of valve member 130, but below triangular aperture 144 as best illustrated in FIG. 6A. The lower end 134 of valve member 130 includes a generally annular recess 148 formed therein dimensioned to receive a conventionally known O-ring 150. Valve member 130 is dimensioned to be positioned within slot 128 of brew basket 24. In this position, the longitudinal axis of valve member 130 is generally aligned with aperture 122 of drain port 118. Lower end 134 of valve member 130 is dimensioned to be received within counterbored hole or recess 120 of brew basket 24 with O-ring 150 being in sealing engagement with the inner surface 124 of hole or recess 120. Valve member 130 is mounted to brew basket 42 by an actuator 160.

Actuator 160 is generally cylindrical in shape and includes a flat inward facing back surface 162 and a generally concave outward facing front surface 164 having a web 166 extending across the face thereof. Web 166 is dimensioned to be gripped by a user of appliance 10, and includes an indicator 168 at one end thereof. Actuator 160 includes a shaft 172 which extends from back planar surface 162. Shaft 172 includes a cam arm 174 and a locking tab 176 which extends from shaft 172 at right angles to the axis thereof. Cam arm 174 and locking tab 176 extends radially outward from shaft 172 and are disposed at generally a right angle to each other, as best seen in FIG. 9. In this respect, cam arm 174 is operable to interact with aperture 144 on valve member 130, and to this end is positioned along shaft 172 to be disposed within triangular aperture 144 of valve member 130 when valve 130 and actuator 160 are mounted to brew basket 24. Locking tab 176 is operable to maintain cam arm 174 within aperture 144 when valve member 130 and actuator 160 are assembled with brew basket 24.

Figure 6:
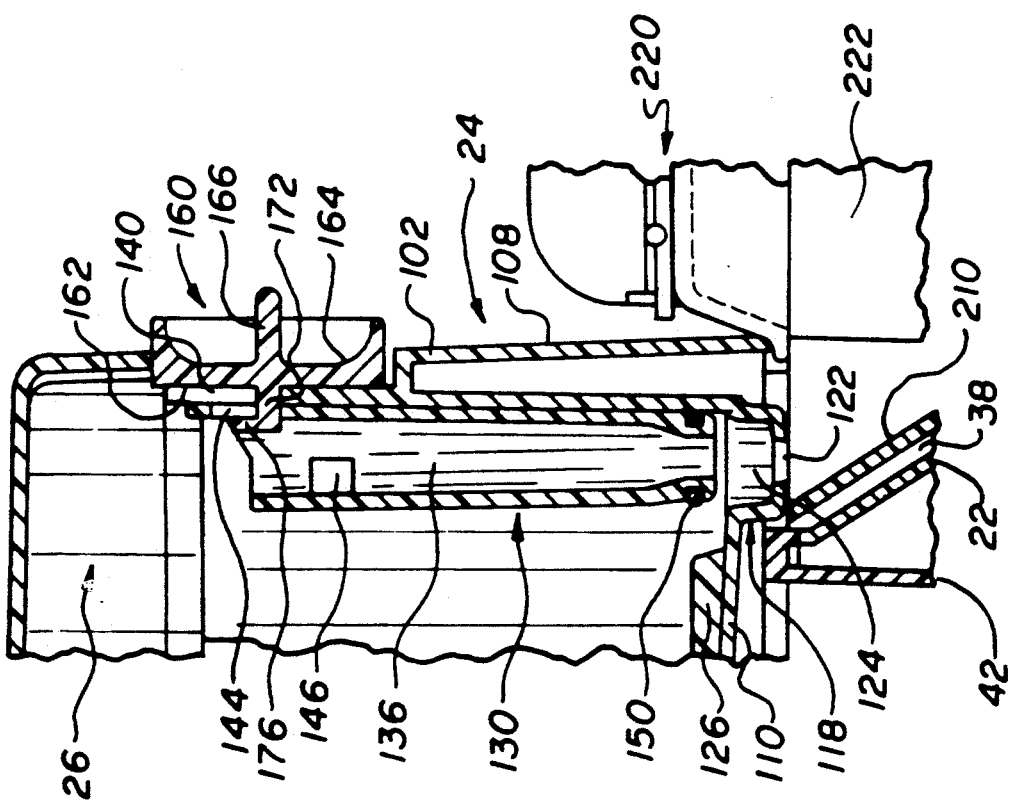
FIG. 6 is an enlarged sectional view of a portion of the brew basket shown in FIG. 2A.

To mount valve member 130 and actuator 160, brew basket 24 includes a generally planar wall portion 182 formed above drain port 118 at the upper edge of inner wall 108. The outer surface of planar wall portion 182 is dimensioned to engage flat back surface 164 of actuator 160, whereas the inner surface of planar wall portion 182 is operable to abut planar surface 138 of valve member 130, as best seen in FIG. 6. A generally vertical slot 140 (best seen in FIG. 4) is provided in planar wall portion 182 to receive shaft 172 of actuator 160. Slot 140 is dimensioned to maintain shaft 172 in snap-lock fashion therein. Valve member 130 and actuator 160 may be fastened to brew basket 24 positioning cam arm 174 within triangular aperture 144 of valve member 130 and then guiding shaft into slot 140 of brew basket 24. In this respect, actuator 160 and valve member 130 are guided over planar wall portion 182 of brew basket 24 such that valve member 130 is received in rectangular slot 128 which is formed in inner wall 108 (as best seen in FIG. 4) and which extends upward from drain port 118, and shaft 172 is guided into slot 140 of wall portion 182 until shaft 172 is snap-locked therein. Cam arm 174 and triangular aperture 144 and valve member 130 have interactive cam surfaces wherein cam arm 174 moving against the inner surface of aperture 144 causes movement of valve member 130 relative to shaft 172 of stationary actuator 160, as illustrated in FIGS. 7 through 9A. Specifically, rotation of actuator 160 causes valve member 130 to move in a vertical direction relative to drain port 118.

In this respect, valve member 130 is movable between a first position as shown in FIG. 9 wherein lower end 134 of valve member 130 is disposed within counterbored recess 120 of drain port 118 with O-ring 150 in sealing engagement with inner surface 124 of drain port 118, and a second position wherein lower end 134 of valve member 130 is removed from drain port 118. In this respect, when valve member 130 is in its first position, flow through aperture 122 of drain port 118 is prevented until fluid within brew basket 24 has reached a predetermined height "H" which is the distance between the bottom of ports 146 on valve member 130 and bottom wall 110 of brew basket 24. As best illustrated in FIGS. 7, 7A, 8 and 8A, rotation of actuator 160 in a clockwise direction causes valve member 130 to move to a "second position" wherein lower end 134 of valve member 130 is removed from drain port 118 and flow therethrough is permitted. Valve member 130 thus creates an elevated drain outlet (i.e. ports 146) when in its "first position" and creates a lower drain outlet (i.e. aperture 122) when in its "second position". The "first position" may be referred to as a "closed" position and the "second position" may be referred to an "open" position, and in the embodiment shown, the outer surface of outer wall 102 includes markings "OPEN" and "CLOSED" which are indicative of, by means of indicator 168 on web 166, the relative position of valve member 130 in relation to the position of actuator 160. Importantly, irrespective of the position of valve member 130, fluid within brew basket 24 will always be drained through aperture 122 of drain port 118, i.e. either through the internal bore 136 of valve member 130 when valve member 130 is in its first or "closed" position and fluid in chamber 112 exceeds height "H" or directly through aperture 122 when valve member 130 is in its second or "open" position.

Figure 3:
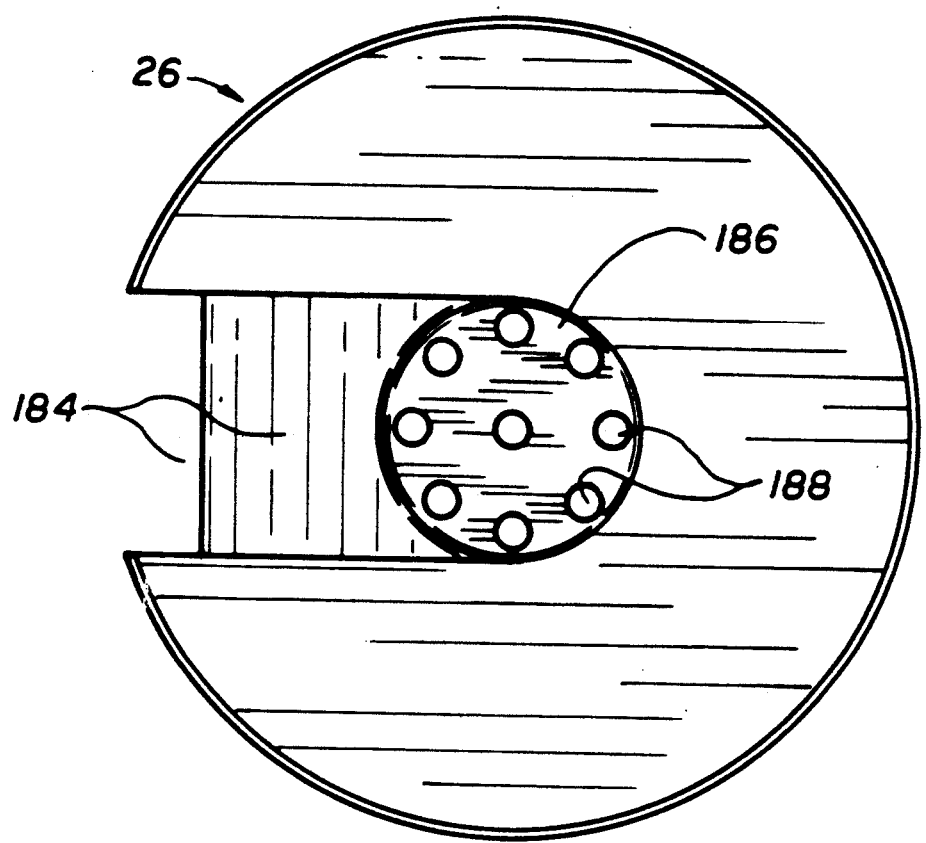
FIG. 3 is a plan view taken along line 3—3 of FIG. 2A showing a brew basket cover of the appliance shown in FIG. 1.

Referring now to FIG. 3, brew basket cover 26 is shown. Cover 26 is provided to cover brew basket 24 and to enclose chamber 112. To this end, cover 26 is cylindrical in shape and has an outer profile dimensioned to conform to the outer profile defined by base member 22 and brew basket 24. Cover member includes an L-shaped recess 184 along its side and top which is dimensioned to receive shroud 28 therein. A circular recess 186 is provided below opening 70 in shroud 28. Recess 186 includes a plurality of apertures 188 to permit heated water from opening 70 to drip into chamber 112 of brew basket 24.

As indicated above, base member 22, brew basket 24, cover 26 and shroud 28 are preferably formed to be assembled into a columnar unit having a generally continuous linear outer profile as shown in FIG. 1. As will be discussed in greater detail below, this shape not only provides an aesthetically pleasing appearance, but also facilitates compact storage.

Figure 10A:
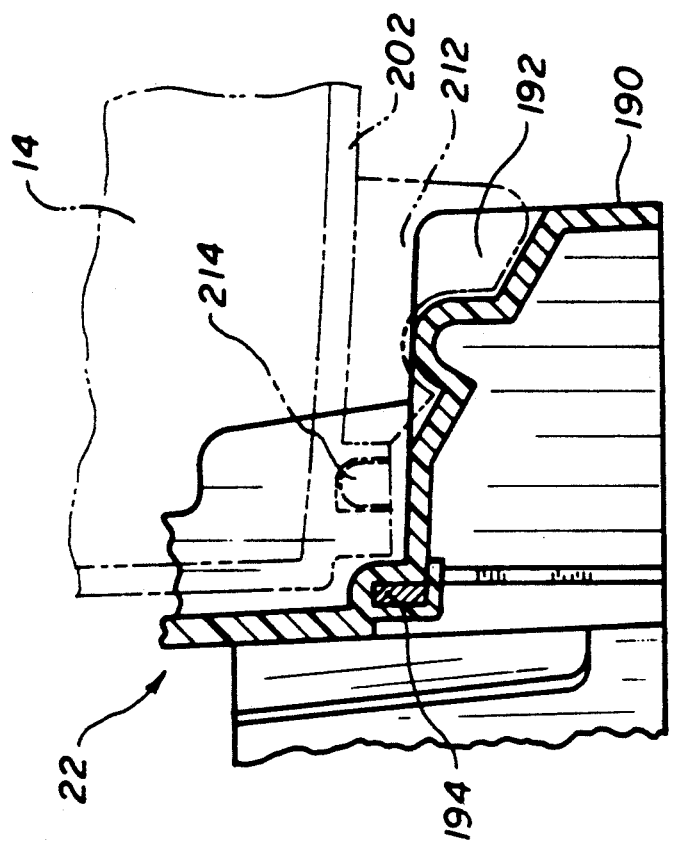
FIG. 10A is a sectional view taken along lines 10A—10A of FIG. 10.
Figure 10:
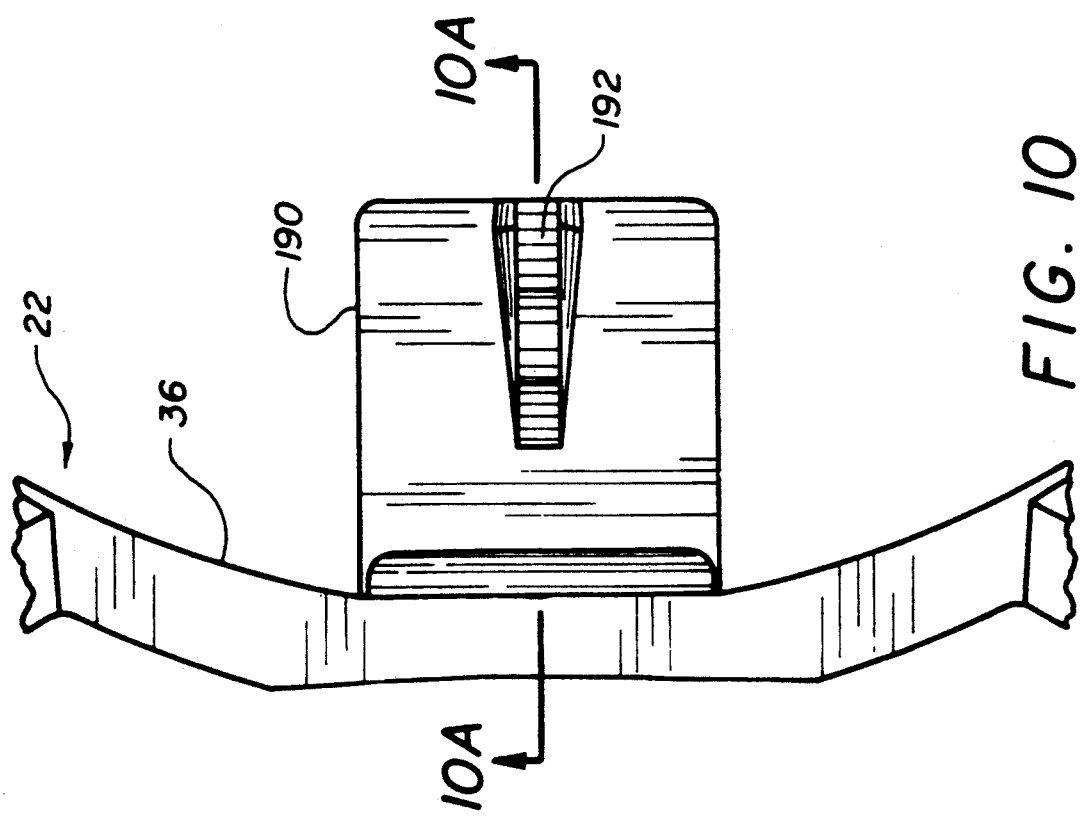
FIG. 10 is an enlarged sectional view taken lines 10—10 of FIG. 2B.

Referring now to FIGS. 10 and 10A, an outward extending projection 190 formed on base member 22 is shown. Projection 190 is generally rectangular in shape and includes a slot 192 therein. A magnetic sensing element 194 is disposed within projection 190 as best seen in FIG. 10A. Magnetic sensing element 194 is part of the electrical circuit connected to heating unit 42, which circuit is operable to permit current to heating unit only when sensing element 194 detects the presence of a magnet thereby.

Referring now to receptacle 14, receptacle 14 is generally cylindrical in shape having a closed lower end 202 and an opened upper end 204, and defining a cylindrical beverage holding cavity 206. The radius of curvature of the outer diameter of receptacle 14 is preferably dimensioned to correspond to the radius of curvature of arcuate recess 36 of base member 22, such that receptacle 14 may be located in proper position against base member 22 by merely moving receptacle 14 into a mating engagement with recess 36 thereof. According to the present invention, closed lower end 202 of receptacle 14 includes a downward extending cylindrical skirt 208, a spout 210 (shown in FIG. 2A) is formed on upper end 204. Spout 210 is dimensioned to be received within triangular indentation 38 of base member 22 when receptacle 14 is positioned thereagainst. Importantly, according to the present invention, a notch or opening (not shown) is provided in skirt 208 directly below spout 210 to receive projection 190 on base member 22. A downward extending tab 212 shown in phantom in FIG. 10A is provided on receptacle 14 to be received in slot 192 of projection 190 to align receptacle 14 in a predetermined position relative to base member 22. Importantly, a magnet 214 is secured to the lower portion of receptacle 14 to be positioned adjacent magnetic sensing element 194 when receptacle 14 is positioned against base member 22. Receptacle 14 also preferably includes a handle 216 to facilitate handling thereof. In the embodiment heretofore described, receptacle 14 preferably has a capacity to hold three (3) quarts of liquid.

A lid 220, best seen in FIGS. 1 and 2A, is provided for receptacle 14. Lid 220 is dimensioned to rest upon the upper edge of receptacle 14 and includes a downward extending cylindrical flange 222. Flange 222 is preferably dimensioned to snugly fit within receptacle 14 and has a length operable to maintain lid 220 with receptacle 14 when beverage is poured therefrom.

According to another aspect of the present invention, brewing unit 12, receptacle 14 and lid 220 are dimensioned for compact packaging and storage. Specifically, receptacle 14 is preferably dimensioned to have an inner diameter and shape slightly larger than the outer diameter of brewing unit 12 wherein receptacle 14 may be placed over brewing unit 12 in telescoping fashion. Further, the inner diameter of flange 222 of lid 220 is dimensioned to be slightly larger than the outer diameter of skirt 208 on receptacle 14, wherein lid 220 may be positioned on skirt 208 of receptacle 14, when receptacle 14 is inserted and stored on brewing unit 12. Thus, the entire appliance may be packaged or stored in a minimum space, with receptacle 14 inverted and on brewing unit 12, and lid 220 setting on skirt 208 of receptacle 14.

Referring now to the operation of the disclosed embodiment, to produce fresh iced tea using the invention disclosed, several trays of ice (approximately four trays or about 48 ounces of ice) are placed within cavity 206 of receptacle 14. Brew basket 24 is removed from brewing unit 12. Grooves 104 in outer wall 102 of brew basket 24 facilitates gripping of brew basket 24 and removal therefrom from brewing unit 12. A conventionally known coffee filter is preferably inserted within chamber 112 of brew basket 24, and a predetermined amount of tea (which may be loose or contained in tea bags) is placed within the filter in brew basket 24. With brew basket 24 removed from base member 22, a predetermined amount of water is placed within water reservoir 42. In the embodiment shown, reservoir 42 is dimensioned to receive approximately 50 ounces of water. Cover 26 is then placed upon brew basket 24 and together brew basket 24 and cover 26 are replaced on brewing unit 12 by sliding same onto base member 22 under shroud 28.

Figure 9A:
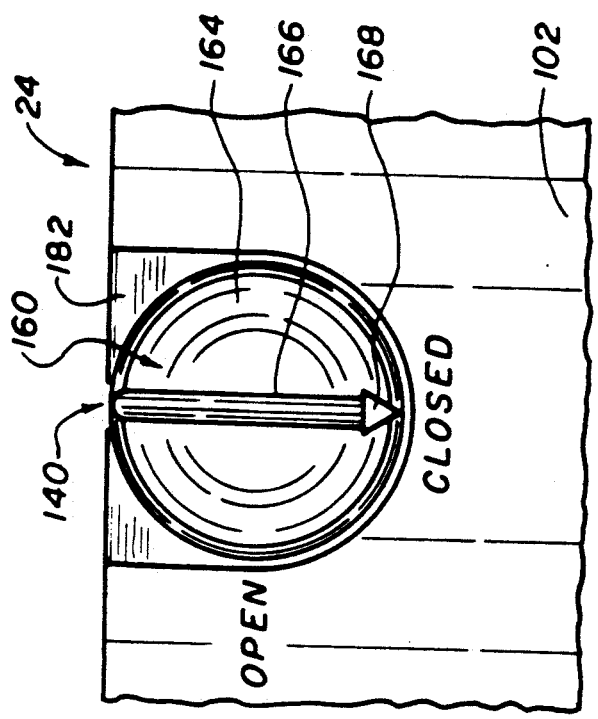
FIGS. 9 and 9A are enlarged views of the valve element and the actuator showing the relative position of such components when the valve element is in the "CLOSED" position.
Figure 9:
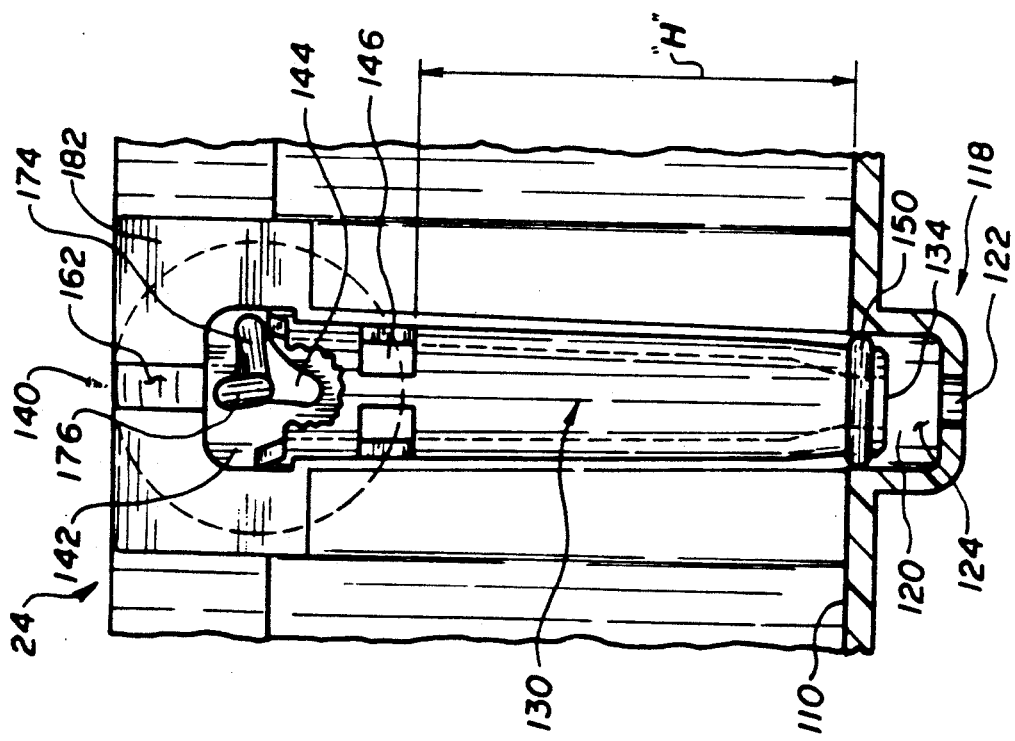

Actuator 160 is moved to the CLOSED position as shown in FIG. 9A wherein valve member 130 is disposed in its first position as shown in FIG. 9. In this position, lower end 134 is received within recess 120 of drain port 118 with O-ring 150 in sealing engagement with inner surface 124. Receptacle 14 is then positioned adjacent brewing unit 12 with spout 210 positioned within triangular indentation 38 of base member 32. In this position, magnet 214 on the lower portion of receptacle 14 is positioned adjacent magnetic sensing element 194 of projection 190 which permits current to flow to heating unit 44 when appliance 10 is actuated.

Operation of appliance 10 is initiated by button switch 90 on base member 22, which activates heating unit 44. Indicator lamp 92 will illuminate when current is provided to heating unit 44. Heat generated by heating core 86 is conducted via the aluminum extrusion to the water in passage 84. As the water is heated, steam is formed in passage 82 which produces a directional flow of water up through the conduit (not shown) in shroud 28 to the opening 70 therein, wherein heated water is directed through apertures 188 in cover 26 into chamber 112 of brew basket 24. As heated water is directed into chamber 112, valve member 130 which is in its "closed" position prevents immediate drainage of the brewed, heated water through drain port 118. This causes water within brew basket 24 to rise in level and to submerge the tea or coffee within chamber 112. In this respect, the water and steeping tea continue to build up, i.e. produce a "head" of water, within chamber 112 until it reaches level "H" defined by ports 146 of valve member 130. Importantly, the tea within brew basket 24 is continuously steeping in the hot water maintained within chamber 112 by valve member 130. As will be appreciated, water (i.e. brewed tea) reaching ports 146 will drain therethrough, into ports 146 of valve member 130 to aperture 122 in drain port 118. Brewed tea draining through aperture 122 of brew basket 24 is collected into receptacle 14 by spout 210 wherein it is cooled by the ice contained therein.

The steeping or brewing cycle continues as hot water is continuously forced into chamber 112 by heating unit 44. Once all the water within reservoir 42 has been heated and conveyed to chamber 112 of brew basket 24, the heating core 86 will heat to a temperature at which case the thermostat (not shown) within the control circuit shall kick out the current to the heating unit in a manner as is conventionally known.

Importantly, according to the present invention, the magnetic sensing element within projection 190 of base member 22 ensures that brewing unit 12 does not continually brew or operate in the event that receptacle 14 is removed therefrom. In this respect, should receptacle 14 be removed from its position adjacent brewing unit 12, magnetic sensing circuit 194 will sense removal of the receptacle 14 by noting the absence of magnet 214 thereby causing heating unit 44 to be deactivated which in turn prevents any further flow of heated water to brew basket 24.

Referring now to the head of water which has built up within brew basket 24 during the brewing cycle of appliance 10, upon completion of the brewing cycle, the head of water within brew basket 24 may be released using actuator 160 by rotating same to the OPEN position, thereby causing valve member 130 to move from its first position wherein the lower end 134 obstructs drain port 118 to its second position wherein lower end 134 is removed from drain port 118 and flow is permitted therethrough. In this respect, aperture 122 effectively drains the head of heated, brewed water (tea) from brew basket 24 into receptacle 14.

With respect to the embodiment heretofore described, water heated by heating element 44 generally enters brew basket 24 at approximately 190° Fahrenheit, and may exit brew basket 24 into receptacle 14 as tea at a temperature of approximately 175° Fahrenheit. As indicated above, receptacle 14 is dimensioned to have a capacity sufficient to hold the water from reservoir 44 together with sufficient ice to chill the heated, brewed tea. In the embodiment shown, the final temperature of the iced tea produced by appliance 10 is approximately 42° Fahrenheit.

While the present invention has been described with respect to producing iced tea, it would appreciated that iced coffee can easily be made with the present invention by merely inserting coffee in place of tea in the brewing funnel and by positioning actuator 160 to the OPEN position, wherein brew basket 24 will operate as a conventionally drip-type coffee maker. Moreover, it will be appreciated that the present invention can be modified to produce hot coffee or hot tea in that the improved brew basket, which creates and maintains consistently a predetermined brewing or steeping head of water, may be adapted and used in drip-type coffee makers known heretofore. These and other alterations and modifications will become apparent to those skilled in the art after a reading of the present invention. It is intended that all such modifications and alterations be included insofar as they come within the scope of the patent as claimed or the equivalents thereof.

Thus, having described the invention, the following is claimed:

1. An appliance for brewing a flavor-carrying particulate such as coffee, tea or the like comprising:
   a reservoir for receiving a predetermined amount of water,
   heating means for heating said water,
   a brew basket having a chamber adapted to receive a predetermined amount of said flavor-carrying particulate therein, said brew basket having an open upper end and an aperture at the lowest portion of said chamber,
   means for delivering heated water from said heating means to said chamber, and
   valve means movable between a first position and a second position to provide alternative drain openings at two locations in said chamber, said valve means in its first position facilitating drainage from a drain opening a predetermined height above said lowest portion of said chamber, and in its second position facilitating drainage from a drain opening at said lowest portion of said chamber.

2. An appliance as defined in claim 1 further comprising actuator means outside said chamber for moving said valve means between said first and said second position.

3. An appliance as defined in claim 2 wherein said actuator means is a knob movable along a path, said knob including means operatively engaging said valve means wherein movement of said knob moves said valve means between said first and second positions.

4. An appliance as defined in claim 3 wherein said valve means is an elongated tubular member.

5. An appliance as defined in claim 1 wherein said valve means is a straight tubular member having an internal bore communicating openings at the end thereof, said tubular member being movable along a predetermined path between said first position and said second position.

6. An appliance as defined in claim 5 wherein said tubular member has an upper end and a lower end, the opening in said lower end being in registry with said aperture in said brew basket when said tubular member is in said first position and said lower end being dimensioned such that flow through said aperture is substantially restricted to flow through said bore in said tubular member.

7. An appliance as defined in claim 6 wherein:
   said brew basket includes a recess at the bottom of said chamber, said recess having said aperture at the bottom thereof, and
   said lower end of said tubular member is dimensioned to be received within said recess and forms a generally fluid-type seal therewith.

8. An appliance for making iced tea/coffee comprising:
   a cylindrical, columnar housing containing:
   a reservoir for holding a predetermined amount of water disposed within said housing,
   heating means for heating water from said reservoir, said heating means disposed within said housing,
   a brew basket having a chamber adapted to receive coffee, tea or the like, said chamber having an aperture at the lowest portion thereof for draining brewed, heated tea or coffee from said chamber, said brew basket being positionable within said housing and removable therefrom, and
   a tubular valve member within said chamber movable longitudinally along an axis between a first position and a second position, in said first position one end of said valve member substantially obstructing said aperture wherein the other end of said valve member defines a drain outlet a predetermined height above said lowest portion of said chamber facilitating drainage through said tubular member, and in said second position said one end being removed from said aperture facilitating drainage through said aperture.

9. An appliance as defined in claim 8 further comprising manually operable actuating means outside said chamber for selectively moving said value member, said actuating means being accessible outside said housing.

10. An appliance for automatically making freshly-brewed iced tea or iced coffee comprising:
    a reservoir for holding a predetermined amount of water,
    a heating system disposed below said reservoir for heating said water,
    a brew basket disposed above said reservoir having a chamber adapted to receive coffee particulate or tea particulate therein,
    a drain outlet in said brew basket,
    tubular valve means within said brew basket for cooperation with said drain outlet in said brew basket to drain brewed coffee or brewed tea from said brew basket, said tubular valve means having a first end and a second end and being movable between a first position wherein said first end of said valve means substantially obstructs said drain outlet at the lowest point in said chamber, resulting in drainage through said second end of said tubular valve means which is located a predetermined height above said lowest point in said chamber, and a second position wherein said first end of said valve means is removed from said drain outlet and facilitates drainage from said drain outlet,
    a housing containing said reservoir, said heating unit, said brew basket and said valve means, and
    an actuator on said housing operably connected to said valve means for moving said valve means between a first position and said second position.

11. An appliance as defined in claim 10 wherein said brew basket is removable from said housing.

12. An appliance as defined in claim 11 wherein said brew basket is dimensioned to form a portion of said housing.

13. An appliance as defined in claim 10 wherein said housing is generally columnar and has a generally continuous linear outer profile.

14. An appliance as defined in claim 10 wherein said housing includes a recess dimensioned to receive a receptacle, said recess disposed adjacent said valve means wherein said receptacle may be positioned below the drain outlet defined by said valve means.

15. An appliance as defined in claim 10 wherein said appliance includes a receptacle dimensioned to be positioned adjacent said housing in mating fashion therewith, said receptacle being disposed to receive brewed, heated water from said drain outlet defined by said valve means.

16. An appliance as defined in claim 15 wherein said appliance includes means for sensing when said receptacle is disposed in mating fashion with said housing.

17. An appliance as defined in claim 16 wherein said sensing means is operable to deactivate said heating system when said receptacle is not disposed in mating fashion with said housing.

18. An appliance as defined in claim 17 wherein said sensing means include magnetic means.

19. An appliance as defined in claim 10 wherein said valve means is a straight tubular member having an internal bore connecting two open ends, said tubular member being movable along its longitudinal axis between said first position and said second position.

20. An appliance as defined in claim 19 wherein:
said brew basket includes an aperture at the lowermost point in said chamber, one open end of said tubular member being in registry with said aperture when said tubular member is in said first position, and
said appliance further including sealing means for creating a seal between said tubular element and said brew basket when said tubular member is in said first position, wherein the other end of said tubular member is said drain outlet when said tubular member is in said first position and said aperture in said brew basket is said drain outlet when said tubular member is in said second position.

21. An appliance as defined in claim 20 wherein said sealing means is disposed on said one open end.

22. An appliance as defined in claim 21 wherein:
said tubular element is generally cylindrical in shape and said sealing means is an O-ring on said one open end, and
said brew basket includes a counterbored recess at said lowest point in said chamber, said recess having said aperture at the bottom thereof and being dimensioned to receive said on open end of said tubular member therein wherein said O-ring is in sealing engagement therewith.

23. In an appliance for automatically brewing coffee or tea, said appliance having means for providing heated water for brewing at a predetermined location therein, a brew basket for holding, tea, coffee or the like and for receiving heated water at said predetermined location,
said brew basket having:
a generally cylindrical shape, a closed lower end and an open upper end defining a chamber for receiving said coffee, tea and water,
an aperture located at the lowest portion of said chamber for draining said basket, said aperture including surface means thereabout,
an elongated, tubular valve member having an upper end, a lower end and an internal bore communicating an opening in said upper end with an opening in said lower end, said lower end dimensioned to matingly engage with said surface means of said aperture and to form a generally fluid-tight seal therewith wherein said opening in said lower end is in communication with said opening in said aperture, said valve member being movable between a first position wherein said lower end of said valve member is displaced from said aperture and a second position wherein said lower end of said valve member matingly engages said aperture such that fluid within said chamber is drained from said basket through said valve member bore and said aperture when said fluid reaches said opening in said upper end of said valve member, and
actuator means for selectively controlling the position of said valve member.

24. A brew basket as defined in claim 23 wherein said actuator means is exposed on the external surface of said brew basket.

25. An appliance for automatically making freshly-brewed tea or coffee comprising:
a reservoir for holding a predetermined amount of water,
a heating system for heating said water,
a brew basket having a chamber adapted to receive coffee particulate or tea particulate therein and a drain port at the bottom of said chamber for draining liquid from said chamber, and
valve means associated with said chamber, said valve means having a passage therethrough and being manually movable to a first position wherein one end of said passage through said valve means communicates with said drain port and the other end of said passage is disposed a predetermined height above the bottom of said chamber, said one end of said passage substantially obstructing said drain port, resulting in the accumulation of liquid in said chamber to said predetermined height, liquid exceeding said predetermined height flowing through said passage to said drain port.

26. An appliance as defined in claim 25 wherein said drain port is disposed to one side of said brew basket.

27. An appliance as defined in claim 25 further comprising,
an elongated, generally vertical housing having a generally continuous linear outer profile, said housing containing said reservoir, said heater, said brew basket and said valve means.

28. An appliance as defined in claim 27 wherein said housing includes a recess dimensioned to receive at least a portion of a receptacle therein and wherein said drain port in said brew basket is disposed above said recess.

29. An appliance as defined in claim 28 wherein said receptacle includes a pouring spout and said recess is dimensioned to receive said pouring spout.

30. An appliance as defined in claim 25 for making iced tea or iced coffee further comprising:
a receptacle having an open upper end for receiving brewed coffee or tea, and
a generally cylindrical housing dimensioned to contain said water reservoir, said heating system, said brew basket and said valve means, said housing including a recess dimensioned to receive a portion of said receptacle therein, said drain port disposed above said recess wherein fluid drained from said drain port is received in said receptacle through said open upper end.

31. An appliance as defined in claim 25 wherein said valve means is an elongated tubular member open at both ends having an internal bore extending therethrough, said bore defining said path when said valve means is in said first position.

32. An appliance for automatically making freshly-brewed iced tea or iced coffee comprising:
a reservoir for holding a predetermined amount of water,
a heating system for heating said water, a brew basket having a chamber adapted to receive coffee particulate or tea particulate therein and a drain port at the bottom of said chamber for draining liquid from said chamber, valve means within said brew basket, said valve means having a passage therethrough and being manually movable to a first position wherein one end of said passage through said valve means communicates with said drain port and the other end of said passage is disposed a predetermined height above the bottom of said chamber, said one end of said passage substantially obstructing said drain port, resulting in the accumulation of a level of liquid in said chamber to said predetermined height above the bottom of said chamber, liquid exceeding said predetermined height flowing through said drain passage to said drain port, a generally columnar housing dimensioned to contain said water reservoir, said heating system and said brew basket in a stacked alignment, and a receptacle for receiving brewed tea or coffee from said brew basket.

33. An appliance as defined in claim 32 wherein said valve means is an elongated tubular member open at both ends having an internal bore extending therethrough, said bore defining said path when said valve means is in said first position.

34. An appliance as defined in claim 32 further comprising sensing means for sensing when said receptacle is adjacent said housing, said sensing means operable to deactivate said heating system when said receptacle is not adjacent said housing.

35. An appliance for automatically making freshly-brewed iced tea or iced coffee comprising:

a reservoir for holding a predetermined amount of water, a heating system for heating said water, a brew basket having a chamber adapted to receive coffee particulate or tea particulate therein and a drain port at the bottom of said chamber for draining liquid from said chamber, a valve member with said brew basket, said valve means having a passage therethrough and being manually movable to a first position wherein one end of said passage through said valve member communicates with said drain port and the other end of said passage is disposed a predetermined height above the bottom of said chamber, said one end of said passage substantially obstructing said drain port, resulting in the accumulation of a level of liquid in said chamber to said predetermined height above the bottom of said chamber, liquid exceeding said predetermined height flowing through said passage to said drain port, a receptacle for receiving brewed tea or coffee from said brew basket, and sensing means for sensing when said receptacle is adjacent said housing, said sensing means operable to deactivate said heating system when said receptacle is not adjacent said housing.

36. An appliance as defined in claim 35 wherein said valve member is an elongated tubular element open at both ends having an internal bore extending therethrough, said bore defining said path when said valve member is in said position.

37. In an appliance for automatically brewing tea, coffee or the like, said appliance having means for providing heated water for brewing at a predetermined location therein, a brew basket for holding tea, coffee or the like and for receiving heated water at said predetermined location, comprising:

said brew basket having a chamber adapted to receive coffee particulate or tea particulate therein and a drain port at the bottom of said chamber for draining liquid from said chamber, and a valve member associated with said chamber, said valve member having a passage therethrough and being manually movable to a first position wherein one end of said passage through said valve member communicates with said drain port and the other end is disposed a predetermined height above the bottom of said chamber, said one end of said passage substantially obstructing said drain port, resulting in the accumulation of a level of heated water of predetermined height in said chamber, water exceeding said predetermined height flowing through said passage to said drain port.

38. A brew basket as defined in claim 37 wherein said valve member is an elongated tubular element open at both ends having an internal bore extending therethrough, said bore defining said path when said valve member is in said position.

39. A brew basket as defined in claim 37 wherein said valve member is a tubular element having an internal bore connecting two open ends, said valve member being movable between said first position wherein one end of said valve member encloses said drain port and defines a drain outlet at the other end thereof, said bore through said tubular element defining said path to said drain port, and a second position wherein said valve member is remote from said drain port.

40. A brew basket as defined in claim 37 wherein said brew basket includes actuator means on an external surface thereof operable to move said valve member between said first position and said second position.

41. An appliance for automatically making freshly-brewed iced tea or iced coffee comprising:

a reservoir for holding a predetermined amount of water, a heating system for heating said water, a brew basket having a chamber adapted to receive coffee particulate or tea particulate therein and a drain port at the bottom of said chamber for draining liquid from said chamber, means within said brew basket for creating a predetermined level of heated water in said chamber for steeping tea or brewing coffee, a housing dimensioned to contain said reservoir, said heating system and said brew basket, said housing having a generally continuous linear profile, a receptacle for receiving brewed coffee or tea therein, said receptacle having an open upper end and a closed lower end and being dimensioned to be telescopically received over said housing, and a lid dimensioned to rest upon said open upper end of said receptacle, said lid including a downward extending skirt dimensioned to engage and be mounted on said lower end of said receptacle when said receptacle is inverted and telescopically received over said housing.

42. An appliance as defined in claim 41 wherein said lower end of said receptacle includes a downward extending skirt, and said skirt on said lid is dimensioned to be telescopically received over said skirt on said receptacle.

* * * * *